US012755964B2

(12) United States Patent
Edwards

(10) Patent No.: US 12,755,964 B2
(45) Date of Patent: Oct. 6, 2026

(54) SILICON CARBON COMPOSITE MATERIALS AND METHOD FOR MAKING SAME

(71) Applicant: SICONA BATTERY TECHNOLOGIES PTY LTD, Alexandria (AU)

(72) Inventor: Geoffrey Edwards, Reedy Creek (AU)

(73) Assignee: SICONA BATTERY TECHNOLOGIES PTY LTD (AU)

( * ) Notice: Subject to any disclaimer, the term of this patent is extended or adjusted under 35 U.S.C. 154(b) by 0 days.

(21) Appl. No.: 18/808,686

(22) Filed: Aug. 19, 2024

(65) Prior Publication Data

US 2024/0413318 A1 Dec. 12, 2024

Related U.S. Application Data

(63) Continuation of application No. 18/431,713, filed on Feb. 2, 2024, now abandoned, which is a continuation
(Continued)

(30) Foreign Application Priority Data

Oct. 21, 2020 (AU) ................................ 2020903802

(51) Int. Cl.
H01M 4/36 (2006.01)
H01M 4/133 (2010.01)
(Continued)

(52) U.S. Cl.
CPC ........... H01M 4/366 (2013.01); H01M 4/133 (2013.01); H01M 4/134 (2013.01); H01M 4/386 (2013.01);
(Continued)

(58) Field of Classification Search
None
See application file for complete search history.

(56) References Cited

U.S. PATENT DOCUMENTS

2011/0177393 A1 7/2011 Park et al.
2012/0156493 A1 6/2012 Maisels et al.
(Continued)

FOREIGN PATENT DOCUMENTS

WO 2017040299 A1 3/2017
WO 2022082263 A1 4/2022

OTHER PUBLICATIONS

Li, Xiaolin et al., Mesoporous Silicon Sponge as an Anti-Pulverisation Structure for High-Performance Lithium-Ion Battery Anodes, Nature Communications, 5:4105, 2014.

Primary Examiner — Wyatt P Mcconnell
(74) Attorney, Agent, or Firm — The Belles Group, P.C.

(57) ABSTRACT

The invention relates generally to a method for making a silicon-carbon composite comprising nanoscale silicon and carbon, the method comprising the steps of preparing a dispersion of silicon nanoparticles and the selected form/s of carbon; spray drying the dispersion to form essentially spherical silicon nanoparticles; heat treating the silicon nanoparticles to pyrolyse and/or burn off any polymers, and to strengthen the silicon nanoparticles; coating the silicon nanoparticles with carbon to form the Si:C composite; and optionally, adding additional elements such as lithium, magnesium, nitrogen and halogen gases to the composite, either during the heating step (c) or coating step (d) or during a subsequent heat treatment step. The invention relates further to composites made by such method, an anode made of such composite and a batter comprising such anode.

20 Claims, 3 Drawing Sheets

Related U.S. Application Data of application No. 18/250,044, filed as application No. PCT/AU2021/051221 on Oct. 20, 2021.

(51) Int. Cl.

| | |
|---|---|
| ***H01M 4/134*** | (2010.01) |
| ***H01M 4/38*** | (2006.01) |
| ***H01M 4/587*** | (2010.01) |
| ***H01M 4/62*** | (2006.01) |
| ***H01M 10/0525*** | (2010.01) |
| *H01M 4/02* | (2006.01) |

(52) U.S. Cl.

CPC ........... *H01M 4/587* (2013.01); *H01M 4/622* (2013.01); *H01M 4/625* (2013.01); *H01M 10/0525* (2013.01); *H01M 2004/021* (2013.01); *H01M 2004/027* (2013.01)

(56) References Cited

U.S. PATENT DOCUMENTS

| | | | | |
|---|---|---|---|---|
| 2017/0047584 | A1 | 2/2017 | Hwang et al. | |
| 2018/0342728 | A1* | 11/2018 | Ohsawa | H01M 4/587 |
| 2019/0326589 | A1* | 10/2019 | Ho | H01M 4/1393 |
| 2019/0355980 | A1* | 11/2019 | Holt | H01M 4/625 |
| 2021/0408527 | A1* | 12/2021 | Kim | H01M 4/366 |

* cited by examiner

SILICON CARBON COMPOSITE MATERIALS AND METHOD FOR MAKING SAME

RELATED PATENT APPLICATIONS

The present nonprovisional patent application is a continuation of U.S. patent application Ser. No. 18/431,713, filed Feb. 2, 2024, which in turn is a continuation of U.S. patent application Ser. No. 18/250,044, filed Apr. 21, 2023, which in turn is a national stage entry under 35 U.S.C. 371 of International Patent Application Serial No. PCT/AU2021/051221, filed Oct. 20, 2021, which in turn claim priority to Australian Provisional Patent Application Serial No. 2020903802, filed 21 Oct. 2020, the entireties of which are incorporated herein by reference.

FIELD OF THE INVENTION

The present invention relates to silicon composite materials for use as anode materials in lithium ion batteries.

Although the present invention will be described hereinafter with reference to its preferred embodiment, it will be appreciated by those of skill in the art that the spirit and scope of the invention may be embodied in many other forms.

BACKGROUND OF THE INVENTION

Any discussion of the prior art throughout the specification should in no way be considered as an admission that such prior art is widely known or forms part of common general knowledge in the field.

With social progress, increasing energy demands are becoming more pronounced in fields such as electronics, renewable energy generation systems and electric vehicles. One means of addressing this every-increasing demand is via improved battery technologies.

Lithium-ion batteries (LIBs) are considered candidates for the increasing demand of portable electronic devices and electric and hybrid vehicles due to their high energy densities and stable cycle life.

Typical LIBs consist of a lithium metal cathode and an anode separated by a liquid electrolyte that transfers lithium between the two electrodes. Batteries provide power by discharging lithium from the anode to the cathode via the electrolyte. To date, most lithium-ion batteries use anodes made of graphite, layers of carbon sheets arranged in hexagonal patterns. The wide space between these layers provides the perfect location to store lithium atoms moving into and out of the anode as the battery charges and discharges. The maximum amount of lithium that can be stored in the anode determines the capacity of the battery, limiting how far a car can be driven before needing to be recharged. The capacity of traditional lithium-ion batteries with graphite anodes is around 370 mAh/g, enough to power a laptop, but insufficient for long travel.

Among various anode materials, silicon has attracted considerable attention because of its highest theoretical specific capacity (about 4200 mAh g-1), which is ten times higher than that of conventional carbon anodes and satisfactory potentials for lithium insertion and extraction (<0.5 V versus Li/Li+).

Unfortunately, practical application of Si anodes is currently hampered by multiple challenges. The primary drawback is the huge volume change (~300%) upon full lithiation and the resultant expansion/shrinkage stress during lithiation/delithiation, which may induce severe cracking of Si. This results in the formation of an unstable solid electrolyte interphase (SEI) on the Si surface, and causes lithium trapping in active Si material, consequently leading to irreversible fast capacity loss and low initial coulombic efficiency (CE). This creates problems with cycle life, and also swelling of electrodes which should be kept to less than about 20% for commercial cells.

Moreover, the slow lithium diffusion kinetics in Si (diffusion coefficient between 10-14 and 10-13 cm2 s-1) and low intrinsic electric conductivity of Si (10-5 to 10-3 S cm-1) also significantly affect the rate capability and full capacity utilisation of Si electrodes.

In order to improve cycle life, utilising nanosized silicon has been shown to produce acceptable cycle life since strain on expansion may be accommodated. However, this creates high surface area, leading to significant reaction with electrolyte, and low first cycle efficiencies. Nanosized silicon can also be somewhat expensive.

Silicon nanostructure materials, including nanotubes, nanowires, nanorods, nanosheets, porous and hollow or encapsulating Si particles with protective coatings, have been devoted to achieving improved structural and electrical performance.

Meanwhile, the preparation methods for these nanostructures (e.g., vapor-liquid-solid methods, magnetron sputtering and chemical vapor deposition) are generally complex technologies and multiple steps. Graphite and porous carbon are potential anode materials with relatively small volume change (e.g., ~10.6% for graphite) during the lithiation-delithiation process and have excellent cycle stability and electronic conductivity. Compared with silicon, carbon materials have a similar nature, and they can combine closely with each other, so they are naturally selected as the substrate materials for dispersing silicon particles (i.e., dispersing carriers). Therefore, silicon-carbon composite anodes have been researched extensively because of their higher capacity, better electronic conductivity and cycle stability. However, problems of silicon-carbon anode materials, such as low first discharge efficiency, poor conductivity and poor cycling performance need to be overcome.

Previous work [Li, X., et al. "Mesoporous Silicon Sponge as an Anti-Pulverisation Structure for High-Performance Lithium-Ion Battery Anodes", Nature Communications, 5:4105, 2014] has prevented this volume expansion by breaking up the silicon anode into many small nanoparticles embedded in another material to give them space to swell. However, this solution only generates more problems. The small Si nanoparticles that solve the expansion problem are vulnerable to irreversible reactions with liquid electrolyte seeping into the anode (known as the solid electrolyte interphase). These reactions hinder silicon's ability to take in lithium ions and reduce the overall lifetime of the battery. In addition, the small particles have poor conductivity, reducing the ability of the battery to provide enough current to power cars or other devices. So far, no anode design has been able to both limit volume expansion and prevent unwanted side effects such as electrolyte interactions and low conductivity.

Recently, a collaboration between the University of Waterloo and General Motors has developed a new method to protect the tiny silicon particles from the electrolyte while preserving their conductivity. The method creates a structural scaffolding around the silicon nanoparticles that allows lithium ions to intercalate but keeps the electrolyte out. The design combines three different materials: Si nanoparticles, graphite sheets with sulfur substituting for some carbon atoms (sulfur-doped graphene), and an organic polymer known as polyacrylonitrile (PAN). After mixing all the ingredients together, the silicon nanoparticles tend to covalently bond with the sulfur sites in the graphite. This strong interaction naturally creates a network of silicon particles bound to intermittent sulfur locations between graphite layers.

Heating the mixture slowly to about 450° C. develops a structural framework of PAN around and between the graphite layers. The ability of PAN to sneak its way through the entire graphene-Si structure shields the Si nanoparticles from the electrolyte while also providing a dense network of molecules along which electrons can travel. Thus, the anode design solves both the electrolyte and conductivity problems seen in previous anode designs. At the same time, the Si nanoparticles are happily stuck to the sulfur-doped graphene sheets, with plenty of room to expand between the graphite layers during lithium intercalation.

It is an object of the present invention to overcome or ameliorate at least one of the disadvantages of the prior art, or to provide a useful alternative.

The present invention relates generally to porous carbon/silicon composite particles to address one or more of the many problems with silicon.

It is an object of an especially preferred form of the present invention to provide composite particles and methods of production that provide enhanced porosity and silicon-to-carbon ratios, whilst being sealable with coatings of suitable thickness.

Although the invention will be described with reference to specific examples it will be appreciated by those skilled in the art that the invention may be embodied in many other forms.

Definitions

In describing and defining the present invention, the following terminology will be used in accordance with the definitions set out below. It is also to be understood that the terminology used herein is for the purpose of describing particular embodiments of the invention only and is not intended to be limiting.

Unless defined otherwise, all technical and scientific terms used herein have the same meaning as commonly understood by one having ordinary skill in the art to which the invention pertains.

Unless the context clearly requires otherwise, throughout the description and the claims, the words "comprise", "comprising" and the like are to be construed in an inclusive sense as opposed to an exclusive or exhaustive sense; that is to say, in the sense of "including, but not limited to".

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising", "consisting of" and "consisting essentially of", where one of these three terms are used herein, the presently disclosed and claimed subject matter may include the use of either of the other two terms. Thus, in some embodiments not otherwise explicitly recited, any instance of "comprising" may be replaced by "consisting of" or, alternatively, by "consisting essentially of".

Other than in the operating examples, or where otherwise indicated, all numbers expressing quantities of ingredients or reaction conditions used herein are to be understood as modified in all instances by the term "about", having regard to normal tolerances in the art. The examples are not intended to limit the scope of the invention. In what follows, or where otherwise indicated, "%" will mean "weight %", "ratio" will mean "weight ratio" and "parts" will mean "weight parts".

The term "substantially" as used herein shall mean comprising more than 50%, where relevant, unless otherwise indicated.

The recitation of a numerical range using endpoints includes all numbers subsumed within that range (e.g., 1 to 5 includes 1, 1.5, 2, 2.75, 3, 3.80, 4, 5, etc.).

The terms "preferred" and "preferably" refer to embodiments of the invention that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the invention.

It must also be noted that, as used in the specification and the appended claims, the singular forms "a", "an" and "the" include plural referents unless the context clearly dictates otherwise.

The person skilled in the art would appreciate that the embodiments described herein are exemplary only and that the electrical characteristics of the present application may be configured in a variety of alternative arrangements without departing from the spirit or the scope of the invention.

Although example embodiments of the disclosed technology are explained in detail herein, it is to be understood that other embodiments are contemplated. Accordingly, it is not intended that the disclosed technology be limited in its scope to the details of construction and arrangement of components set forth in the following description or illustrated in the drawings. The disclosed technology is capable of other embodiments and of being practised or carried out in various ways.

SUMMARY OF THE INVENTION

Applicant has surprisingly discovered that certain composite properties may be achieved using nanoparticles of silicon, various forms of carbon, and coatings of carbon. Such composite properties render the resultant coated Si:C nanoparticles amendable to use in lithium ion batteries.

Furthermore, Applicant has surprisingly discovered methods for producing the composites that are comprised generally of low-cost processes.

Preferred embodiments of the present invention incorporate low-cost silicon and amounts of various allotropes of carbon that are optimised to achieve an advantageous combination of cost and performance in the resultant LIB.

According to a first aspect of the present invention there is provided a silicon-carbon composite comprising nanoscale silicon and carbon in a weight ratio of between about 30:70 and about 70:30, and having a volume fraction of porosity between about 20 and about 70%.

In an embodiment, the weight ratio of the nanoscale silicon to carbon is about 60:40.

In an embodiment, the volume fraction of porosity is about 50%.

In an embodiment, the volume fraction of porosity is about double the volume fraction of silicon.

In an embodiment, the porosity of the composite accommodates swelling up to about 300% during the lithiation-delithiation process.

In an embodiment, the carbon is a fibrous form of carbon, such as carbon nanotubes (CNTs) and/or thin nanoplates, such as graphene or graphene oxide or reduced graphene oxide, or combinations thereof.

In an embodiment, the composite further comprises carbon produced by pyrolysis of a polymeric precursor such as sugars, including glucose, sucrose, fructose and the like.

In an embodiment, the composite is sealed with a carbon coating of appropriate thickness.

In an embodiment, the coating reduces the available (effective) surface area of the Si:C particles by between about 50 and about 80%.

In an embodiment, the coating is less than about 500 nm thick.

In an embodiment, the composite is for use as an anode in a lithium ion battery.

According to a second aspect of the present invention there is provided an anode for a lithium ion battery comprising a silicon-carbon composite according to the first aspect of the present invention.

According to a third aspect of the present invention there is provided a half cell for a lithium ion battery comprising an anode according to the second aspect of the present invention, binder and a conducting additive in a weight ratio of composite to binder to conducting additive of about 8:1:1.

In an embodiment, the binder is carboxylmethyl cellulose (CMC)/styrene-butadiene rubber (SBR) and the conducting additive is Imerys C45 carbon black.

In an embodiment, the counter electrode is lithium metal.

According to a fourth aspect of the present invention there is provided a lithium ion battery comprising an anode according to the second aspect of the present invention, a cathode, an electrolyte and a separator.

According to a fifth aspect of the present invention there is provided a method for making a silicon-carbon composite comprising nanoscale silicon and carbon, the method comprising the steps of: (a) preparing a dispersion of silicon nanoparticles and the selected form/s of carbon; (b) spray drying the dispersion to form essentially spherical, micrometre-sized composite particles; (c) heat treating the composite particles to pyrolyse and/or burn off any polymers, and to strengthen the composite particles; (d) coating the composite particles with carbon to form the Si:C composite; and (e) optionally, adding additional elements such as lithium, magnesium, nitrogen and halogen gases to the composite, either during the heating step (c) or coating step (d) or during a subsequent heat treatment step.

According to a sixth aspect of the present invention there is provided a method for making a silicon-carbon composite comprising nanoscale silicon and carbon, the method comprising the steps of: (a) preparing a dispersion of silicon nanoparticles by milling in water and retaining the mixture of silicon and water; (b) optionally, preparing a separate dispersion of selected form/s of carbon in water, optionally comprising one or more surfactants; (c) adding the carbon dispersion and optional surfactant mixture (or carbon in non-dispersed form) to the silicon-water dispersion; (d) dispersing the resultant mixture; (e) spray drying the resultant dispersed Si:C mixture to form essentially spherical particles; (f) heat treating the essentially spherical particles to pyrolyse and/or burn off any polymers, and to strengthen the spherical Si:C particles; (g) coating the heat treated spherical Si:C particles with carbon using a chemical vapor deposition process to form a carbon-coated Si:C composite; and (h) optionally, adding additional elements adding additional elements such as lithium, magnesium, nitrogen and halogen gases to the composite to the carbon-coated Si:C composite, either during mixing step (c) or dispersion step (d) or during subsequent heat treatment.

In an embodiment of the fifth or sixth aspects, the selected form/s of carbon comprise carbon nanotubes (CNTs) and/or thin nanoplates, such as graphene or graphene oxide or reduced graphene oxide and combinations thereof.

In an embodiment of the fifth or sixth aspects, the weight ratio of the nanoscale silicon to carbon is about 60:40.

In an embodiment of sixth aspect, the surfactant/s are non-ionic.

In an embodiment of the fifth or sixth aspects, the carbon further comprises carbon produced by pyrolysis of a polymeric precursor such as sugars, including glucose, sucrose, fructose and the like.

In an embodiment of the fifth or sixth aspects, the volume fraction of porosity in the particles prior to coating is about 50%.

In an embodiment of the fifth or sixth aspects, the volume fraction of porosity is about double the volume fraction of silicon.

In an embodiment of the fifth or sixth aspects, the composite is sealed with a carbon coating of appropriate thickness.

In an embodiment of the fifth or sixth aspects, the coating reduces the available (effective) surface area of the Si:C particles by between about 50 and about 80%.

In an embodiment of the fifth or sixth aspects, the thickness of the coatings is less than about 500 nm.

According to a seventh aspect of the present invention there is provided a silicon-carbon composite comprising nanoscale silicon and carbon, when made by a process according to the fifth aspect of the present invention.

According to an eighth aspect of the present invention there is provided a carbon-coated silicon-carbon composite comprising nanoscale silicon and carbon, when made by a process according to the sixth aspect of the present invention.

According to a ninth aspect of the present invention there is provided an anode for a lithium ion battery comprising a silicon-carbon composite according to the seventh aspect or a carbon-coated silicon-carbon composite according to the eighth aspect of the present invention.

According to a tenth aspect of the present invention there is provided a half cell for a lithium ion battery comprising an anode according to the ninth aspect of the present invention, binder and a conducting additive in a weight ratio of composite to binder to conducting additive of about 8:1:1.

According to an eleventh aspect of the present invention there is provided a lithium ion battery comprising an anode according to the ninth aspect of the present invention, a cathode, an electrolyte and a separator.

According to a twelfth aspect of the present invention there is provided a silicon-carbon composite particle, comprising at least 40% silicon with respect to carbon, comprising at least 50% pores, wherein the carbon is comprised of graphene and carbon nanotubes, where the amount of graphene with respect to the total amount of graphene and carbon nanotubes is at least 40%.

According to a thirteenth aspect of the present invention there is provided a silicon-carbon composite material, comprising at least 50% pores, where the amount of silicon in the material is greater than 90%.

BRIEF DESCRIPTION OF THE DRAWINGS

A preferred embodiment of the invention will now be described, by way of example only, with reference to the accompanying drawings in which.

DETAILED DESCRIPTION OF A PREFERRED EMBODIMENT

Figure 1A:
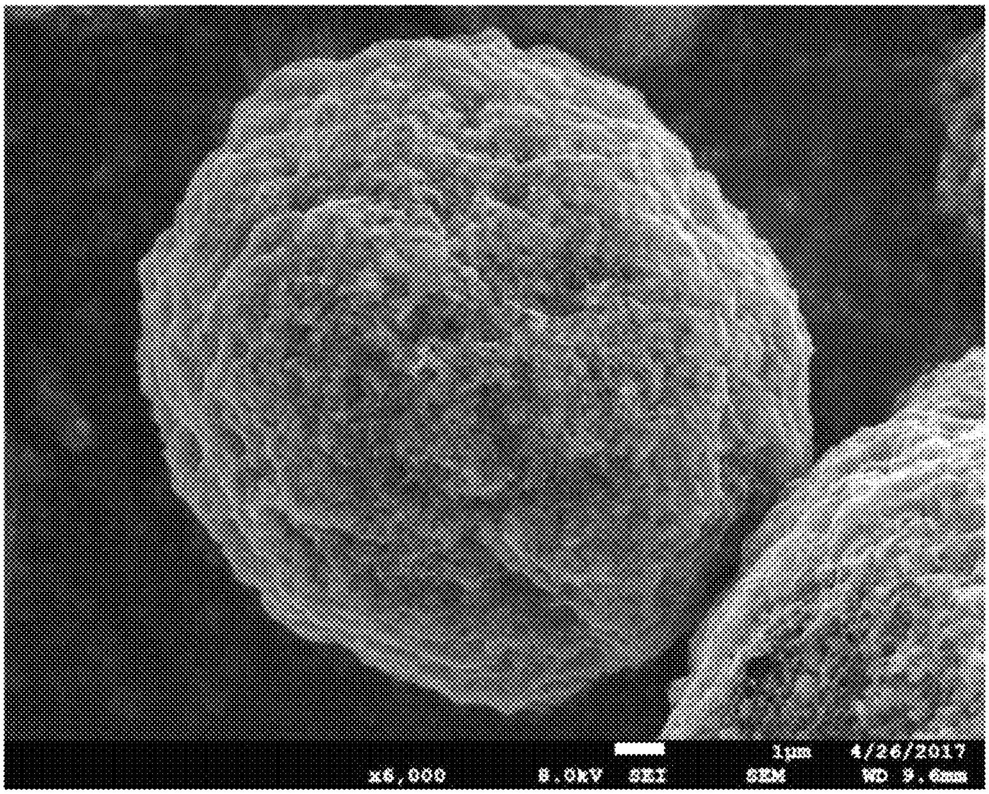
FIG. 1A is a scanning electron microscope (SEM) image of uncoated particles of the composite of the present invention.

Porous particles comprising silicon and carbon appeal as desirable anode materials since the pores may absorb the swelling of the silicon internally and hence reduce swelling in the electrode itself. A high level of porosity is desirable as this enables a higher level of silicon to be incorporated whilst still allowing for swelling.

Carbon may fulfil several roles in the inventive Si:C composite. Firstly, it can separate the silicon particles so that the particles do not impinge upon each other when swelling. A carbon network can also add strength and resilience to the composite particles and provide a strong network for conduction of electrons and lithium ions. However, the gravimetric and volumetric capacity of carbon is much less than silicon. Hence it is desirable to have low amounts of carbon, whilst still allowing the carbon network to fulfil its various functions.

Carbon nanotubes are a good potential source of carbon, since they are able to provide networks with a very low volume fraction of carbon due to their very small diameter. Similarly, graphene and/or graphite nanoplatelets are very thin and can also produce networks with low volume fractions.

For a commercially-relevant product, it is necessary to have a high level of porosity. In some embodiments, the volume fraction (Vf) of porosity to Vf silicon is about 2 to allow for expansion of the silicon internally. In other embodiments, the ratio of Vf porosity to Vf silicon is about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9 or about 4.0.

Preferably, the amount of carbon should be minimised whilst still providing a sufficiently strong conducting network.

Finally, the highly porous structure should be sealable with a coating that is sufficiently thin so that gravimetric and volumetric capacities are not significantly reduced by the coating. By sealing the particles, the liquid electrolyte cannot directly access the surface of the silicon and hence, silicon-electrolyte reactions are minimised. However, highly porous structures would not normally be expected to be good for coating. Also, coating is heavily dependent upon nucleation and growth of the coating and therefore upon the structure of the surface. For nanoscale materials, such structures can be very difficult if not impossible to predict in terms of outcomes for coating processes.

The inventors have discovered that suitable Si:C composites may be prepared using a method comprised of the following steps: (a) Preparing a dispersion of silicon nanoparticles and the selected form/s of carbon; (b) Spray drying the dispersion to form essentially spherical composite particles; (c) Heat treating the silicon nanoparticles to pyrolyse and/or burn off any polymers, and to strengthen the composite particles; (d) Coating the composite particles with carbon to form the Si:C composite; and (e) Optionally, adding additional elements to the composite, either during the heating step (c) or coating step (d) or during a subsequent heat treatment step, that can increase first cycle efficiency and/or increase cycle life. Examples include lithium, magnesium, nitrogen and my further include halogen gases.

A preferred embodiment of the method of the present invention comprises the following steps: (a) Preparing a dispersion of silicon nanoparticles by milling in water and retaining the mixture of silicon and water; (b) Optionally, preparing a separate dispersion of selected form/s of carbon in water, optionally comprising one or more surfactants; (c) Adding the carbon dispersion and optional surfactant mixture (or carbon in non-dispersed form) to the silicon-water dispersion; (d) Dispersing the resultant mixture; (e) Spray drying the resultant dispersed Si:C mixture to form essentially spherical particles; (f) Heat treating the essentially spherical particles to pyrolyse and/or burn off any polymers, and to strengthen the spherical Si:C particles; (g) Coating the heat treated spherical Si:C particles with carbon using a chemical vapor deposition process to form a carbon-coated Si:C composite; and (h) Optionally, adding additional elements to the carbon-coated Si:C composite, either during mixing step (c) or dispersion step (d) or during subsequent heat treatment, that can increase first cycle efficiency and/or increase cycle life. Examples include lithium, magnesium, nitrogen and halogen gases.

In this embodiment, cost is reduced compared to current state-of-the-art by (i) milling in water instead of organic solvents, and (ii) avoiding drying of the silicon nanoparticles.

In preferred embodiments, the porous Si:C composite has a high level of porosity, which enables a high level of silicon to be incorporated whilst still allowing for swelling upon full lithiation and the resultant expansion/shrinkage stress during lithiation/delithiation.

Preferably the volume fraction of porosity in the particles is greater than 30%, or greater than 40%, or greater than 50%, or about 60%. In other embodiments, the volume fraction of porosity is greater than about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69 or about 70%.

In some embodiments the volume fraction of porosity is about double the volume fraction of silicon. In other embodiments, the volume fraction of porosity is about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4 or about 3.5-times the volume fraction of silicon.

The porosity of the Si:C composite accommodates swelling up to about 300%. In an embodiment, the swelling is up to about 350, 340, 330, 320, 310, 300, 290, 280, 270, 260, 250, 240, 230, 220, 210, 200, 190, 180, 170, 160, 150, 140, 130, 120, 110 or about 100%.

In preferred embodiments, the ratio of silicon to carbon is maximised whilst achieving the preferred volume fractions of porosity quoted above. Silicon has much higher gravimetric capacity and volumetric capacity than carbon. Therefore, it is desirable for both gravimetric capacity and volumetric capacity that the ratio of silicon to carbon is maximised.

The ratio of silicon to carbon is an important feature of the present invention. In an embodiment, the ratio may be at least 40:60, or at least 50:50, or at least 60:40, or at least 70:30 on a weight basis. Mixtures of various forms of carbon may give desired performance and cost. In other embodiments, the ratio of silicon to carbon is about 30:70, 31:69, 32:68, 33:67, 34:66, 35:65, 36:64; 37:63, 38:62, 39:61, 40:60, 41:59, 42:58, 43:57, 44:56, 45:55, 46:54; 47:53, 48:52, 49:51, 50:50, 51:49, 52:48, 53:47, 54:46, 55:45, 56:44; 57:43, 58:42, 59:41, 60:40, 61:39, 62:38, 63:37, 64:36, 65:35, 66:34; 67:33, 68:32, 69:31, or about 70:30 w/w. Most preferably, the ratio of silicon to carbon is about 60:40 w/w.

In preferred embodiments, the carbon may be provided by fibrous forms of carbon, such as carbon nanotubes (CNTs). CNTs of low diameters have the advantage of being able to provide a mechanically stable framework with a low volume fraction of carbon. Very thin nanoplates, such as graphene or graphene oxide or reduced graphene oxide can also help achieve a framework with a low volume fraction of carbon. In other embodiments, the carbon may be a mixture of carbon forms, e.g., CNTs interspersed with graphene platelets.

In some embodiments, the carbon network may be improved by small amounts of carbon produced by pyrolysis of a polymeric precursor. Examples of polymeric precursors are sugars, including glucose, sucrose, fructose and the like, and pitch. Such material may improve the connectivity of the carbon network, providing resilience and/or improved Li ion conductivity and/or improved electron conductivity.

The amount of carbon produced in this way may be less than 20%, or less than 10%, or less than 5% of the uncoated composite weight. In other embodiments, the amount of carbon produced in this way may be less than about 30, 29, 28, 27, 26, 25, 24, 23, 22, 21, 20, 19, 18, 17, 16, 15, 14, 13, 12, 11, 10, 9, 8, 7, 6, 5, 4, 3, 2 or less than about 1% of the uncoated composite weight.

In preferred embodiments, particles having the above attributes of porosity, silicon-to-carbon ratio and carbon types/ratios may be essentially sealed with a coating of appropriate thickness. By essentially sealed, Applicant means that the coating reduces the available (effective) surface area of the Si:C particles by at least 50%, preferably at least 80%. In other embodiments, the coating reduces the available (effective) surface area of the Si:C particles by at least about 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or at least about 90%.

The coatings may be less than about 500 nm thick, or less than about 400 nm thick, or less than about 300 nm thick, or less than about 200 nm thick. In preferred embodiments, the coatings may be less than about 600, 580, 560, 540, 520, 500, 480, 460, 440, 420, 400, 380, 360, 340, 320, 300, 280, 260, 240, 220, 200, 180, 160, 140, 120 or less than about 100 nm thick. It will be appreciated that the coatings vary in thickness and thus the quoted thickness is an average thickness across a selection of coated Si:C nanoparticles. Larger particles may have a thicker coating since the relative volume fraction is less. However larger particles may result in poor rate performance. It may be appreciated that the particle size and coating thickness may vary and be optimised for different applications. In an embodiment, the coating thickness is approximately the same as the spacing between the particles in the composite.

Lithium ions enter the Si:C composite by solid state diffusion. In an embodiment, an additive such as glucose and/or sucrose enables the solid state diffusion of the lithium ions into the Si:C composite.

In preferred embodiments, the composite utilises low-cost forms of silicon. In a preferred embodiment, the silicon is in the form of angular nanoparticles that have been produced using a grinding process. In other preferred embodiments, the silicon nanoparticles have been milled in water and the silicon nanoparticles have an oxide formed on the surface. Current state of the art processes prefer silicon with minimal oxide layer. However, Applicant has surprisingly found that good performance may still be achieved using oxidised or part-oxidised silicon nanoparticles.

In some embodiments, the oxide layer may be altered by introduction of elements such as lithium and/or magnesium and/or nitrogen. These layers may improve lithium ion diffusion, and may also react with the oxide, thereby reducing reaction with electrolyte during initial charging and discharging, thus aiding first cycle efficiency.

In the method of the present invention, the dispersion may be spray dried to form particles of about 10 μm in diameter. In other embodiments, the dispersion may be spray dried to form particles of about 1, 2, 3, 4, 5, 6, 7, 8, 9, 10, 11, 12, 13, 14, 15, 16, 17 18, 19, 20, 21, 22, 23, 24 or about 25 μm in diameter. This diameter may be varied using known spray drying parameters to achieve a desired particle size. As would be appreciated by those skilled in the art, particle diameters can be adjusted to give different performance in terms of energy density and power.

The method of the present invention may optionally utilise a step that passivates sites that are active toward electrolytes in cells. Such sites can reduce first cycle efficiencies and cycle life. Examples of such steps include high temperature treatments, introduction of halogen gases during high temperature treatments, and introduction of lithium via evaporation of lithium metal, either during the pyrolysis step or a chemical vapor deposition (CVD) step.

Example 1

Silicon nanoparticles were produced by grinding silicon particles in a water-based medium using a high-speed ball mill. Carbon nanotubes were dispersed in water using a suitable surfactant such as a non-ionic surfactant. The silicon nanoparticle/water mixture, the carbon nanotube/water mixture, and glucose were then dispersed in an aqueous solution, using suitable surfactants. This mixture was then spray dried to give particles with average size about 18 μm diameter. The particles were then pyrolysed in a reducing H2/Ar atmosphere at about 850 oC. The following properties were obtained upon pyrolysis of the surfactant and glucose.

The ratio of silicon-to-carbon nanotubes was about 60:40.

Figure 3:
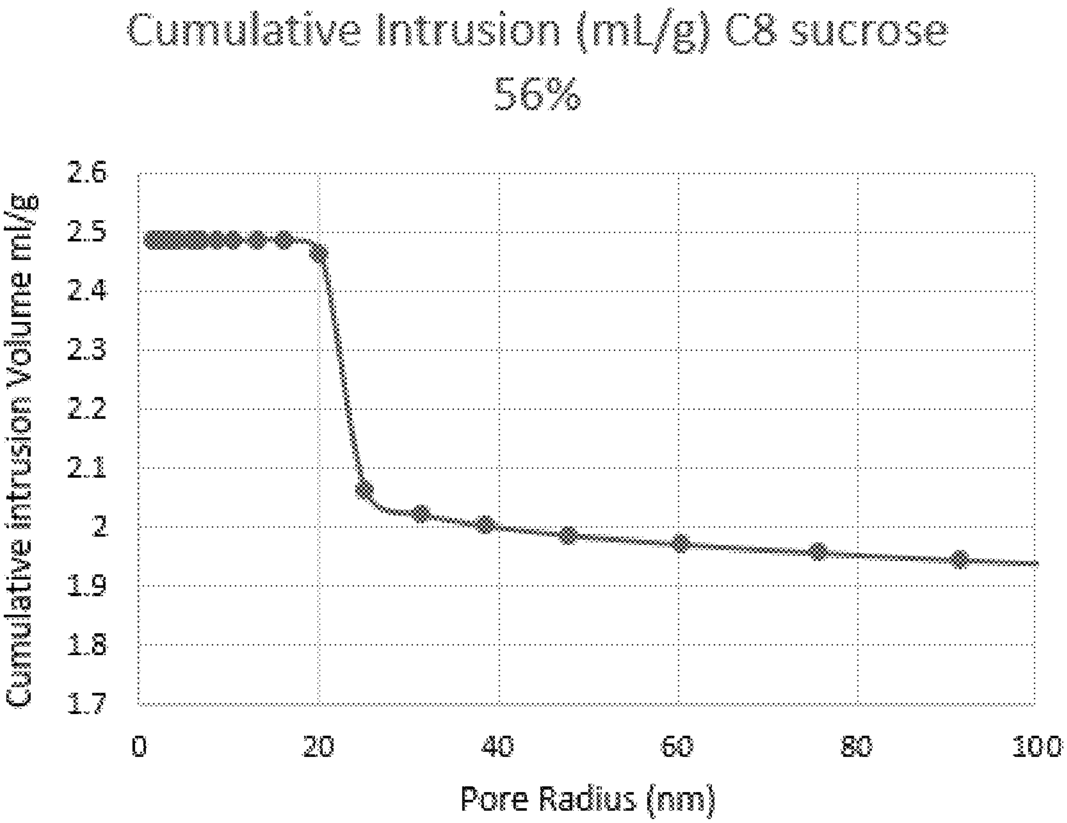
FIG. 3 is a graph illustrating porosity (pore size distribution) of the particles from Example 1 before coating.

FIG. 3 shows porosity (pore size distribution) of the particles from Example 1 before coating. Porosity, as measured by mercury porosimetry, was 56% with the majority of pores less than about 200 nm in size (see, FIG. 3).

Figure 1B:
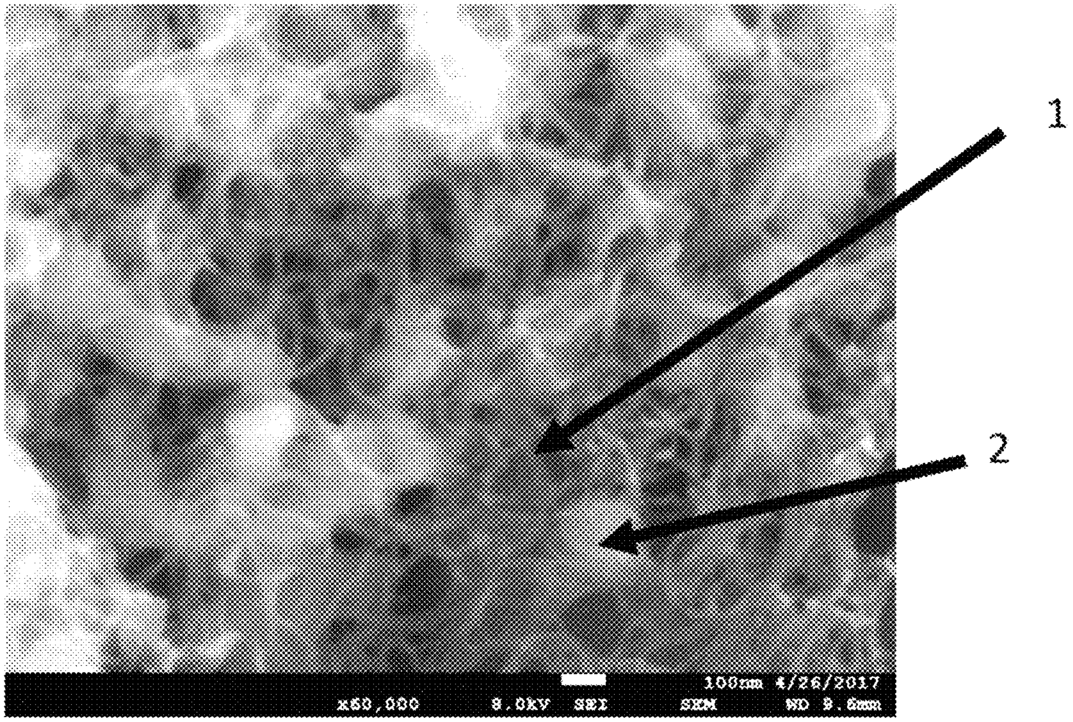
FIG. 1B is a scanning electron microscope (SEM) image of the particles of the present invention.

FIGS. 1A and 1B show scanning electron microscope images of the particles. The porous carbon network (1) contains silicon nanoparticles (2) that are well distributed, i.e., most nanoparticles are not in contact with one another. FIG. 1A shows scanning electron microscope (SEM) images of uncoated particles of the composite of the present invention at 8.0 kV on a scale of 1 μm (a) and FIG. 1B shows scanning electron microscope (SEM) images of uncoated particles of the composite of the present invention at 8.0 kV on a scale of 100 nm.

A carbon coating was deposited on the particles using fluidised bed chemical vapor deposition (CVD) and propane gas at about 1000° C. and with a propane ratio of 32% with respect to the carrier gas of 5% H2 in argon. Scanning electron microscopy showed that the thickness of the coating ranged between about 200 nm and about 300 nm.

Figure 2A:
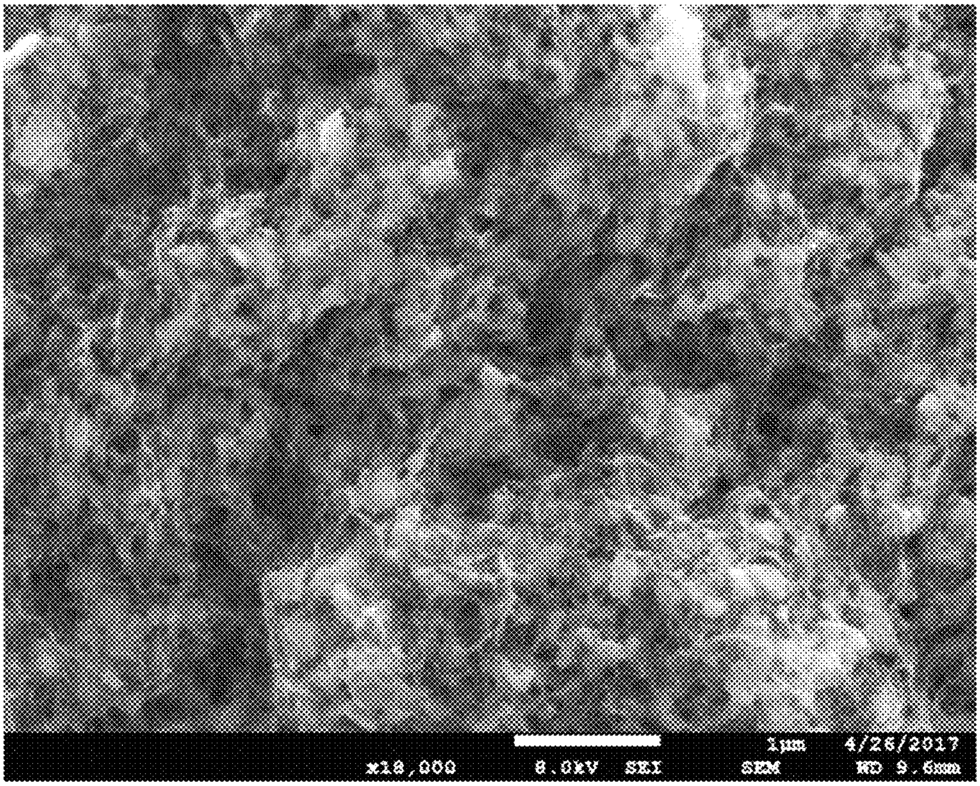
FIG. 2A is a scanning electron microscope (SEM) image of uncoated and coated particles of the composite material of the present invention.
Figure 2B:
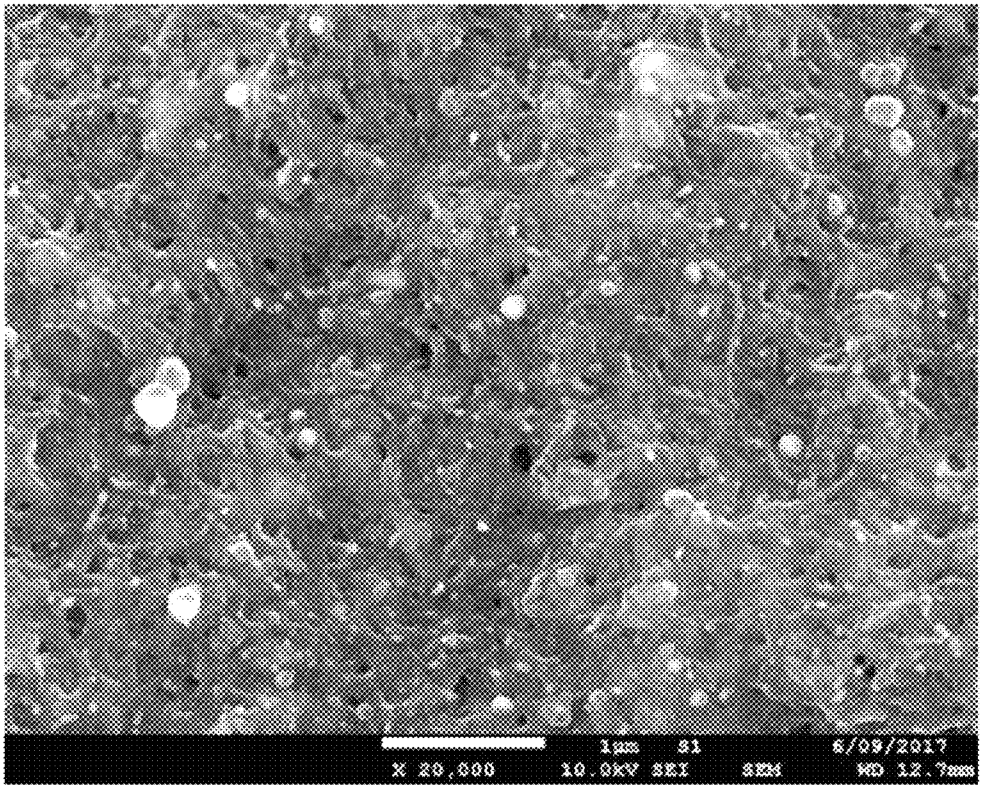
FIG. 2B is a scanning electron microscope image of the particles before and after coating.

FIGS. 2A and 2B show scanning electron microscope images of the particles before (a) and after (b) coating. It can be seen that the coating seals at least 90% of the surface. In similar experiments, the coating was found to reduce the surface area from ~100 m2/g to about 5 m2/g, showing that the particles are effectively sealed by the coatings. FIG. 2A shows a scanning electron microscope (SEM) image of uncoated and coated particles of the composite material of the present invention; 8.0 kV; scale 1 μm (a) and (b). FIG. 2B shows scanning a electron microscope image of the particles before and after coating. The coating seals at least 90% of the surface. In similar experiments, the coating was found to reduce the surface area from ~100 m2/g to about 5 m2/g, showing that the Si nanoparticles are effectively sealed by the coatings.

Half cells were made using the composite material and carboxylmethyl cellulose (CMC)/styrene-butadiene rubber (SBR) binder and using Imerys C45 carbon black as conducting additive. The ratio of composite to binder to C45 was 8:1:1. Lithium metal was the counter electrode. The composite yielded a capacity of ~750 mAh/g and a first cycle efficiency of ~80%.

Comparative Example 1

The procedure in Example 1 was used, however glucose was not added. The composite yielded a capacity of only ~240 mAh/g with a first cycle efficiency of ~70%. Applicant postulates that without the glucose, lithium ions were unable to properly diffuse through the carbon solid, thus reducing capacity.

Comparative Example 2

The procedure in Example 1 was used, however a coating was not applied. The capacity was ~1000 mAh/g. However, the first cycle efficiency was only ~60%. This shows that the coating was necessary to provide reasonable first cycle efficiencies.

Although the invention has been described with reference to specific examples it will be appreciated by those skilled in the art that the invention may be embodied in many other forms.

What is claimed is:

1. A silicon-carbon composite comprising nanoscale silicon and nanoscale carbon, wherein the composite is produced by spray drying a dispersion of silicon nanoparticles and carbon, the nanoscale carbon and nanoscale silicon being present in a weight ratio of silicon to carbon of between about 30:70 and about 70:30, and having a volume fraction of porosity between about 20 and about 70%, wherein the volume fraction of porosity is about double the volume fraction of silicon.

2. An anode for a lithium ion battery comprising the composite according to claim 1.

3. A half cell for a lithium ion battery comprising an anode comprising a silicon-carbon composite according to claim 1, a binder, and a conducting additive in a weight ratio of composite to binder to conducting additive of about 8:1:1.

4. The half cell according to claim 3, wherein the binder is carboxylmethyl cellulose (CMC)/styrene-butadiene rubber (SBR) and the conducting additive is a conductive carbon black powder having a surface area of about 45 $m^2$/g.

5. An electrochemical cell comprising the half cell according to claim 3 and lithium metal as the counter electrode.

6. The composite according to claim 1, wherein the carbon comprises a fibrous form of carbon.

7. The composite according to claim 1, wherein the carbon comprises nanoplates selected from graphene oxide, reduced graphene oxide, or combinations thereof.

8. The composite according to claim 6, wherein the fibrous form of carbon is carbon nanotubes (CNTs).

9. The composite according to claim 8, wherein the carbon nanotubes form a porous carbon network comprising the silicon nanoparticles.

10. The composite according to claim 9, wherein a weight ratio of silicon to carbon nanotubes is about 60:40.

11. The composite according to claim 8 having a porosity of about 56%, wherein more than 50% of pores are less than about 200 nm in size.

12. The composite according to claim 1, wherein the composite is in the form of essentially spherical particles having an average diameter of about 18 μm.

13. The composite according to claim 8, wherein the carbon further comprises carbon produced by pyrolysis of glucose, sucrose, or a combination thereof.

14. The composite according to claim 13, wherein carbon produced by pyrolysis is less than about 20% of an uncoated composite weight.

15. A carbon-coated silicon-carbon composite particle comprising:

nanoscale silicon and carbon nanotube;

wherein the composite particle is formed by spray drying a dispersion of silicon nanoparticles and carbon nanotubes;

wherein the weight ratio of silicon to carbon nanotubes being about 60:40;

wherein the particle is essentially spherical and has a porosity of about 56% with more than 50% of pores less than about 200 nm in size; and wherein the particle further comprises an external carbon coating having an average thickness of about 200 nm to about 300 nm that seals at least 90% of the particle surface.

16. The particle according to claim 15, wherein the coating reduces the surface area of the particle from about 100 $m^2$/g to about 5 $m^2$/g.

17. The particle according to claim 15, wherein the composite particle further comprises carbon produced by pyrolysis of glucose.

18. The particle according to claim 15, wherein the external carbon coating is deposited by chemical vapor deposition.

19. The particle according to claim 18, wherein the chemical vapor deposition is fluidized-bed chemical vapor deposition using propane gas.

20. The particle according to claim 19, wherein the coating is deposited at a temperature of about 1000° C.

* * * * *